US012753866B2

(12) United States Patent
Okumura et al.

(10) Patent No.: US 12,753,866 B2
(45) Date of Patent: Oct. 6, 2026

(54) FILLING NOZZLE SUPPORT STRUCTURE

(71) Applicant: Tatsuno Corporation, Tokyo (JP)

(72) Inventors: Tatsuya Okumura, Tokyo (JP); Akihiro Matsumoto, Tokyo (JP); Toshihiko Ouchi, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 140 days.

(21) Appl. No.: 18/604,178

(22) Filed: Mar. 13, 2024

(65) Prior Publication Data

US 2024/0328548 A1 Oct. 3, 2024

(30) Foreign Application Priority Data

Mar. 31, 2023 (JP) ................................ 2023-057010

(51) Int. Cl.
*F16L 27/08* (2006.01)
*F17C 7/00* (2006.01)

(52) U.S. Cl.
CPC ............ *F16L 27/0849* (2013.01); *F17C 7/00* (2013.01); *F17C 2205/0376* (2013.01);
(Continued)

(58) Field of Classification Search
CPC ... F16L 27/0849; F16L 27/02; F16L 27/1274; F17C 7/00; F17C 2205/0376; F17C 2221/012; F17C 2223/035; F17C 2265/065; F17C 2270/0168; F17C 2270/0184; F17C 2223/0123; F17C 2223/036; F17C 2270/0139; F17C 2270/0178; F17C 5/007; F17C 5/06; F17C 5/00; F17C 13/002; F17C 13/04; F17C 2205/037
See application file for complete search history.

(56) References Cited

U.S. PATENT DOCUMENTS 2,411,235 A * 11/1946 Smith ....................... F17C 5/06 141/105
2,530,523 A * 11/1950 Hittl ........................ F17C 13/02 141/105
(Continued)

FOREIGN PATENT DOCUMENTS

| | | |
|---|---|---|
| CN | 215061305 U * | 12/2021 |
| JP | H0676117 B2 * | 9/1994 |
| JP | 2003128199 A | 5/2003 |

*Primary Examiner* — Donnell A Long
(74) *Attorney, Agent, or Firm* — Stetina Garred Brucker & Newboles

(57) ABSTRACT

To provide a support structure that can eliminate difficulty of operation due to rigidity of a filling hose and prevent difficulty in removing a filling nozzle from a receptacle after filling. A support structure (100) of the present invention includes a swivel joint (3: the first swivel joint) in a filling hose (2) that connects a filling nozzle (1) and a gas supply pipe of the dispenser (10) (for example, a hydrogen supply pipe), and the swivel joint (3) comprises a nozzle side member (3B) communicating with the filling nozzle (1) side, and a dispenser side member (3A) communicating with the dispenser (10) side, the nozzle side member and the dispenser side member are relatively rotatable, and a high-pressure gas flow path (3AR) formed in the nozzle side member and a high-pressure gas flow path (3BR) formed in the dispenser side member are orthogonal to each other.

13 Claims, 10 Drawing Sheets

(52) U.S. Cl.
CPC .. *F17C 2221/012* (2013.01); *F17C 2223/035* (2013.01); *F17C 2265/065* (2013.01); *F17C 2270/0168* (2013.01); *F17C 2270/0184* (2013.01)

(56) References Cited

U.S. PATENT DOCUMENTS

| | | | | | |
|---|---|---|---|---|---|
| 2,871,669 | A * | 2/1959 | Mann | F17C 3/10 62/157 | |
| 3,632,235 | A * | 1/1972 | Grenci | F17C 5/06 417/901 | |
| 5,095,947 | A * | 3/1992 | Weh | F16L 37/36 285/321 | |
| 10,041,628 | B2 * | 8/2018 | Otaki | F17C 5/06 | |
| 2007/0046020 | A1 * | 3/2007 | Brass | F16L 27/0849 285/98 | |
| 2014/0261837 | A1 * | 9/2014 | van der Meijden | E04H 4/1645 285/272 | |
| 2016/0102794 | A1 * | 4/2016 | Chung | F16L 27/0828 285/179 | |
| 2017/0314511 | A1 * | 11/2017 | Yudanov | F02M 21/0212 | |
| 2018/0163928 | A1 * | 6/2018 | Takezawa | F16K 1/385 | |
| 2018/0202608 | A1 * | 7/2018 | Unno | B67D 9/00 | |
| 2019/0017616 | A1 * | 1/2019 | Takezawa | B60K 15/04 | |
| 2021/0278049 | A1 * | 9/2021 | Selleck | F16L 27/0837 | |
| 2022/0214016 | A1 * | 7/2022 | Takezawa | F17C 7/00 | |

* cited by examiner

【Fig. 1】
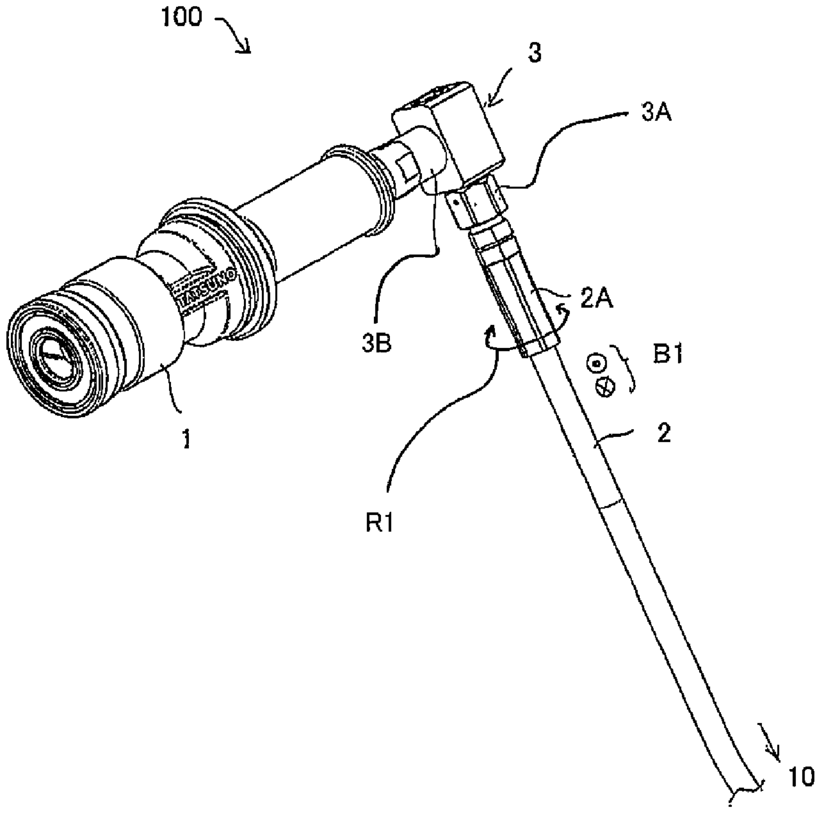

【Fig. 2】
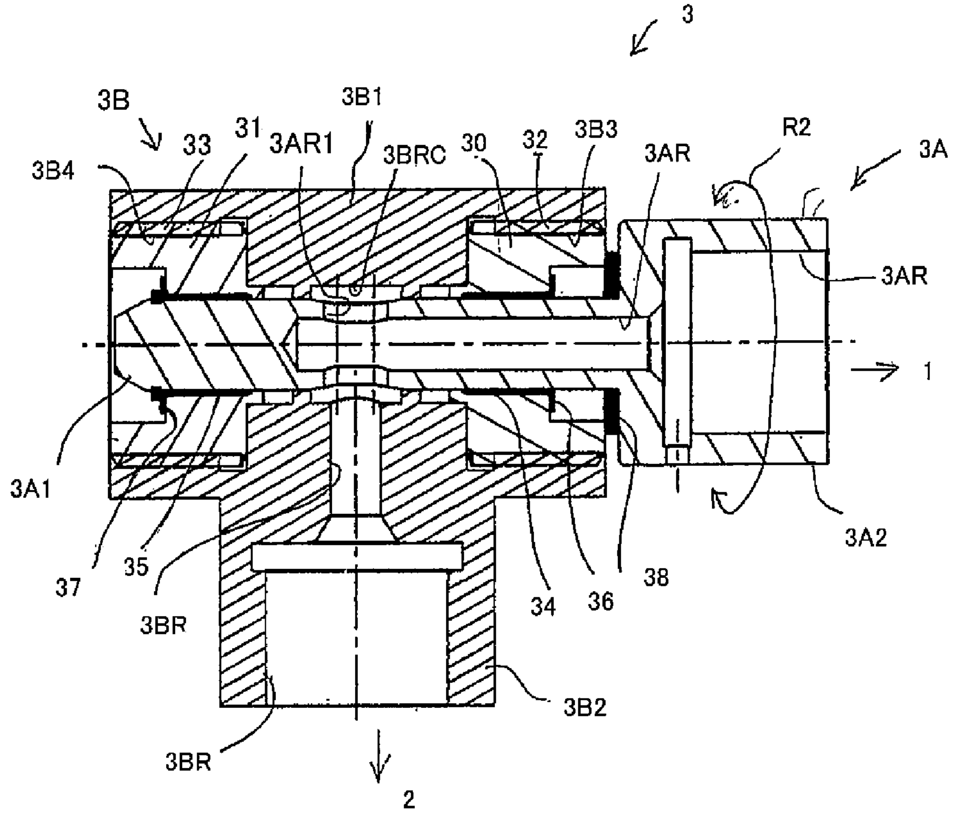

【Fig. 3】
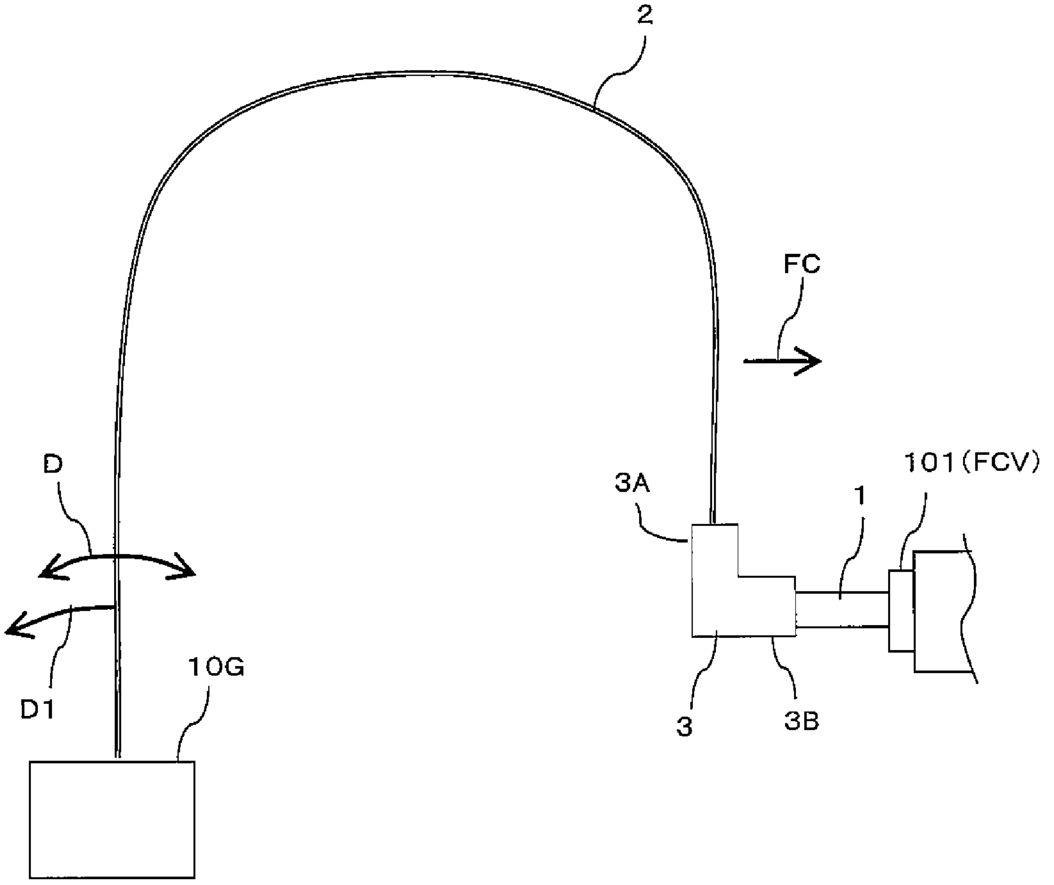

【Fig. 4】
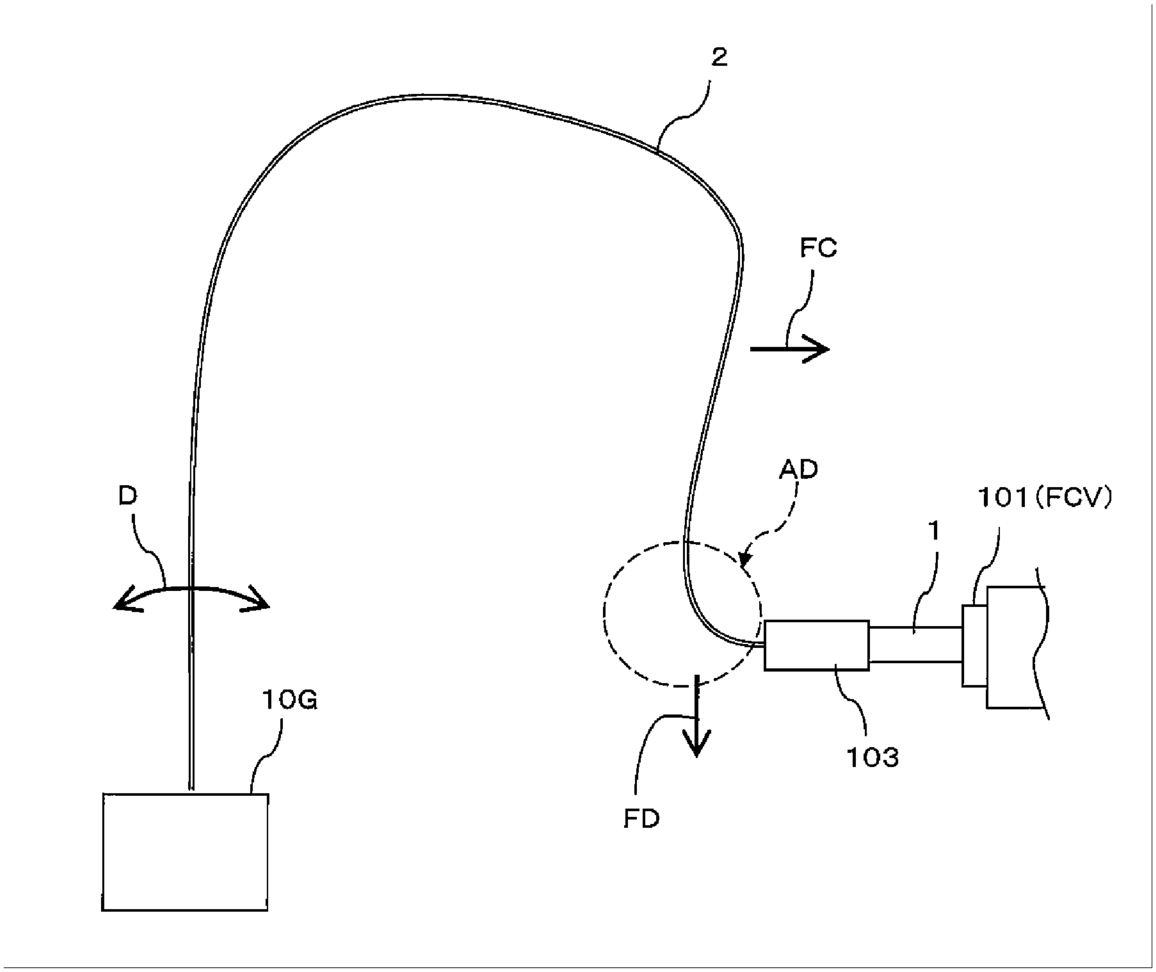

【Fig.5】
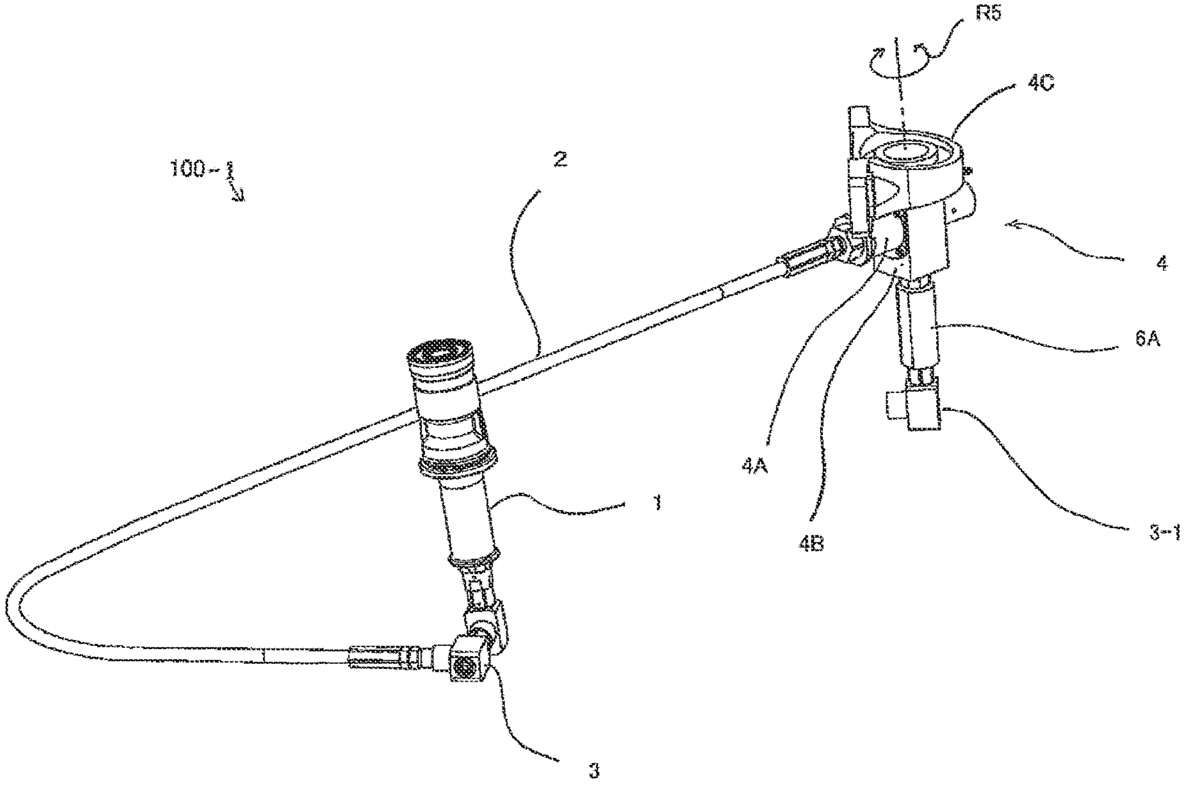

【Fig.6】
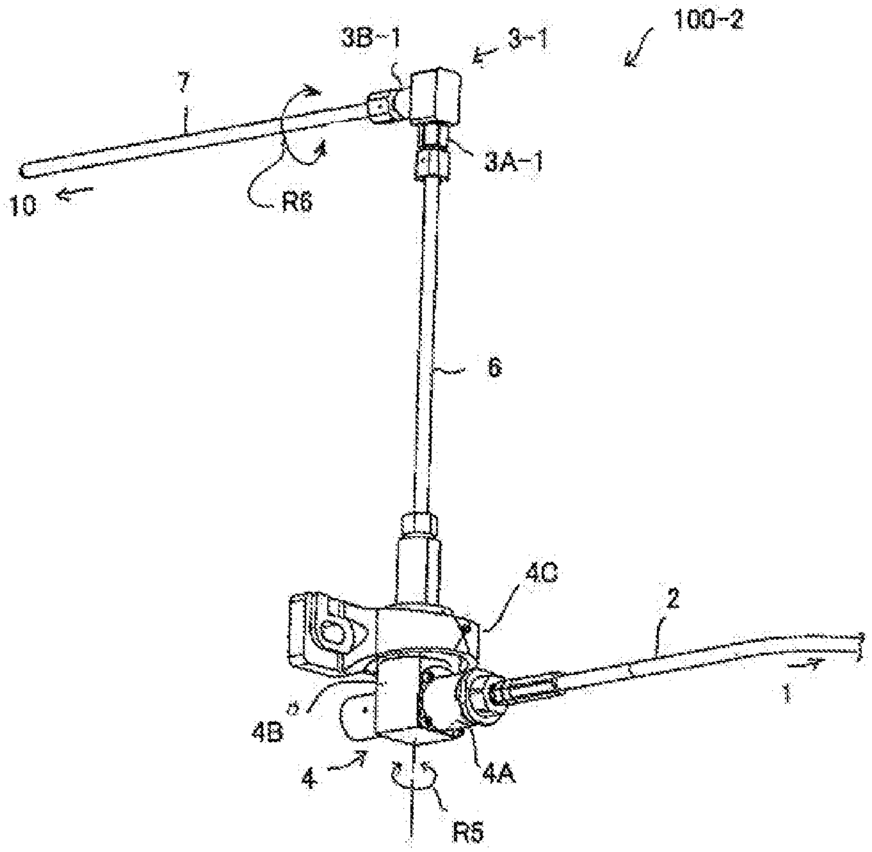

【Fig. 7】
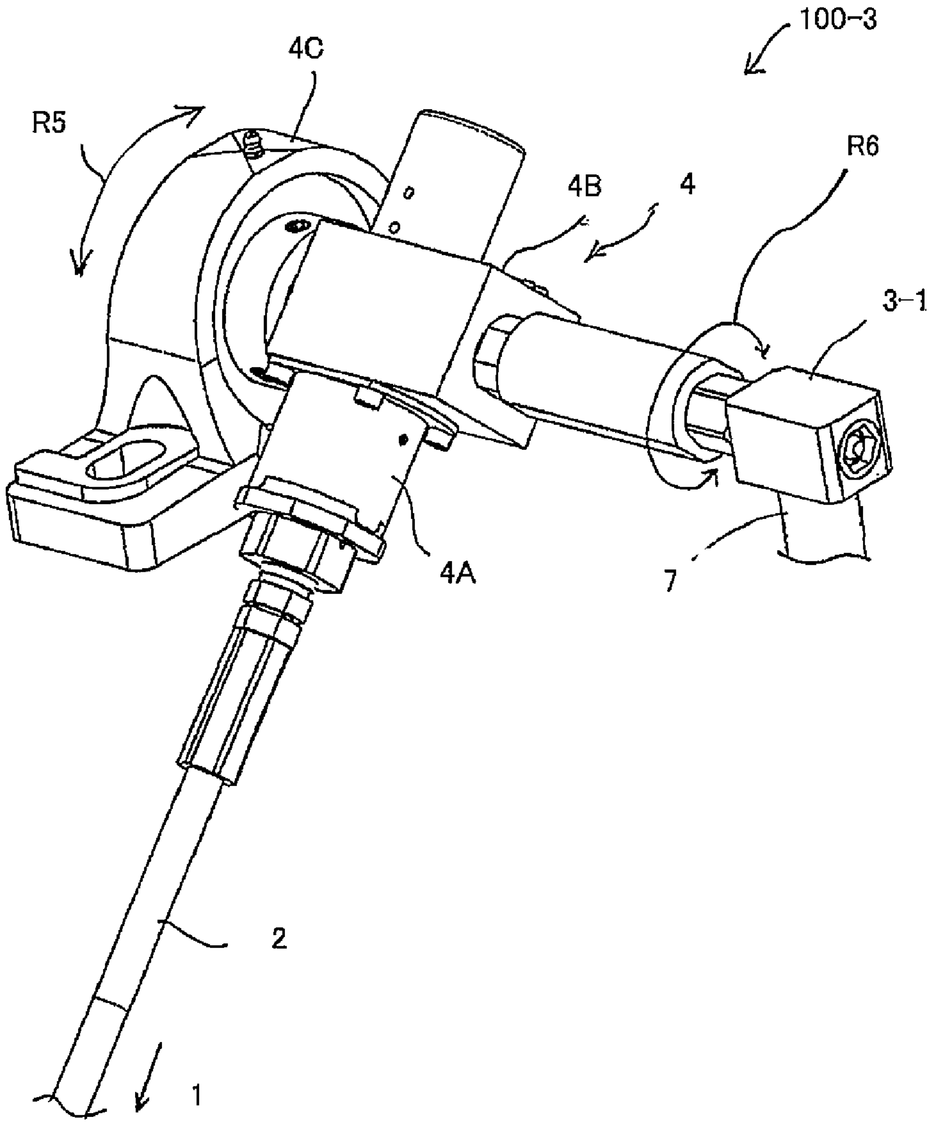

【Fig.8】
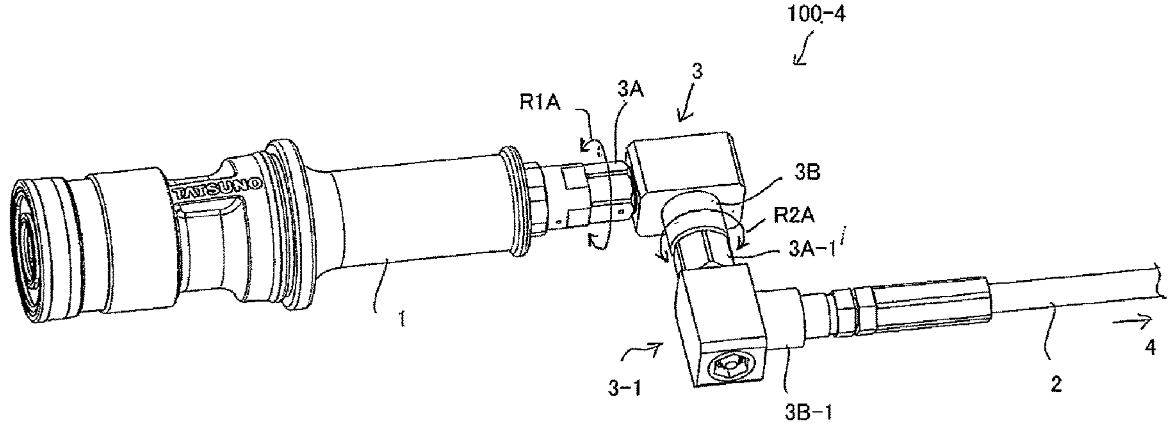

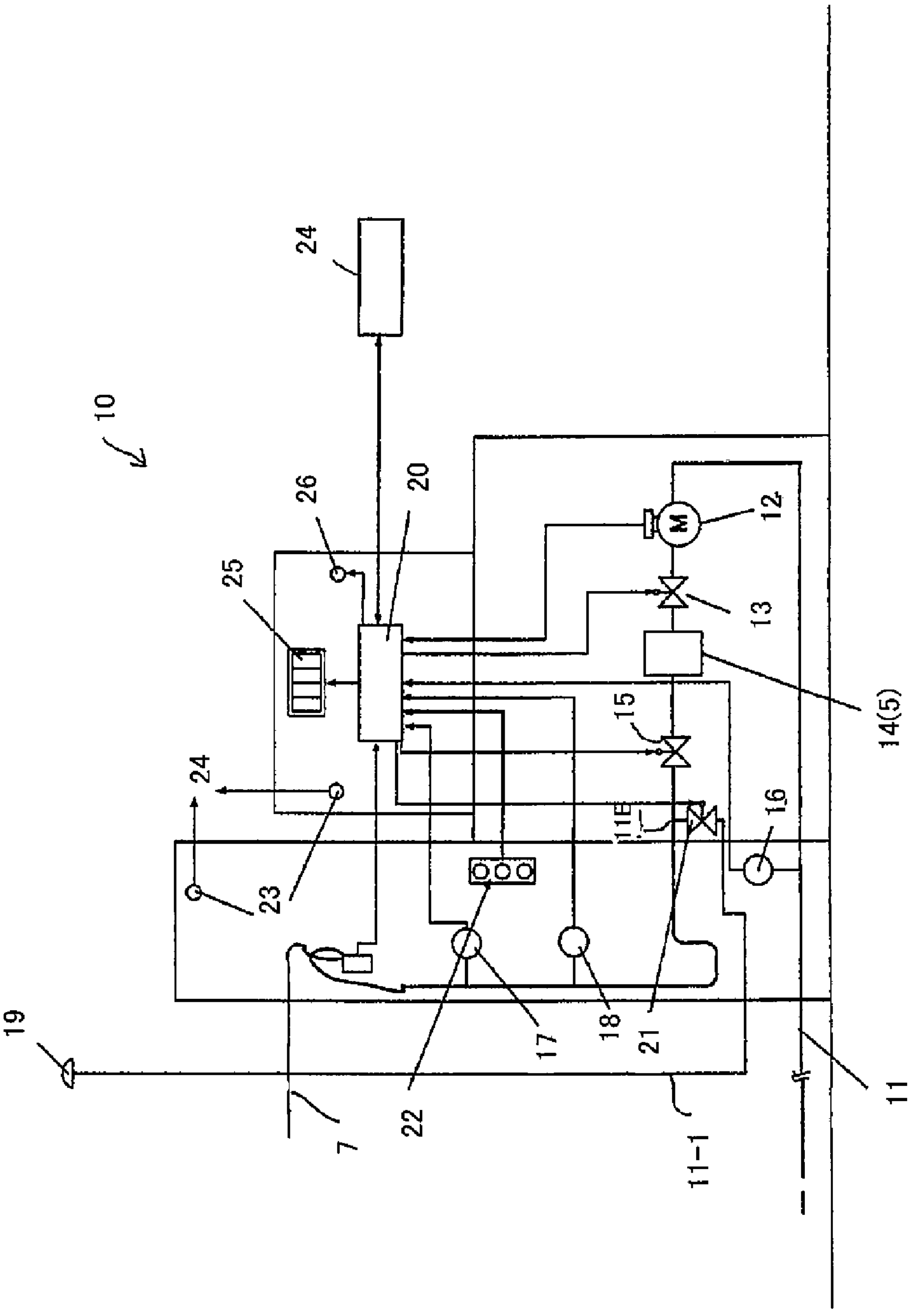
【Fig.9】

【Fig. 10】
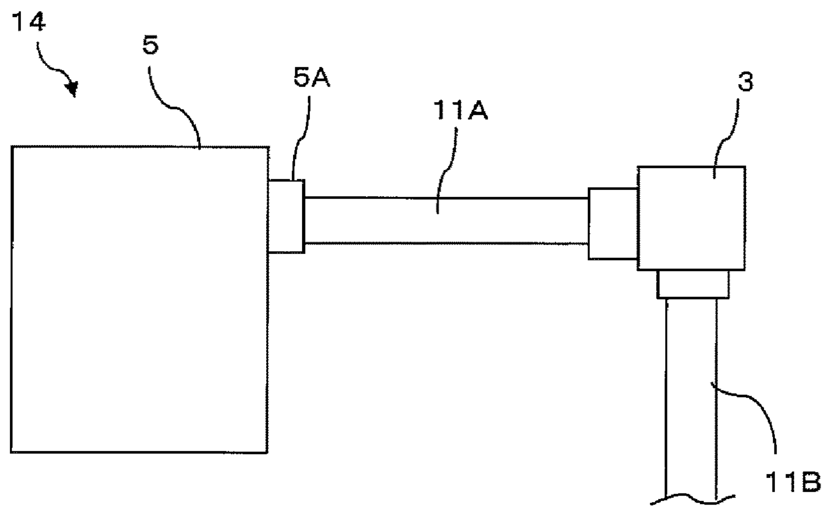
【Fig. 11】
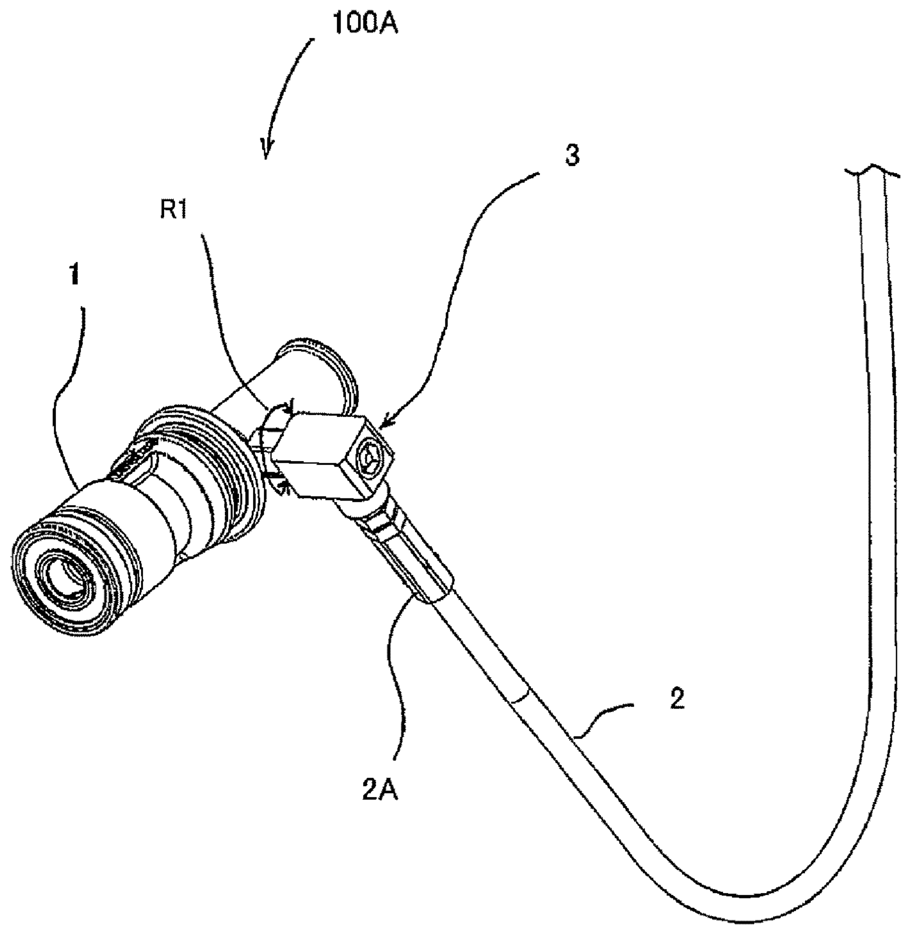

FILLING NOZZLE SUPPORT STRUCTURE

CROSS-REFERENCE TO RELATED APPLICATIONS

The present application claims priority to Japanese Patent Application No. 2023-057010 filed on Mar. 31, 2023, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a high-pressure gas filling device such as a hydrogen supply device for a fuel cell vehicle (FCV), more specifically to a support structure for a filling hose and a filling nozzle of the high-pressure gas filling device.

2. Description of the Related Art

Filling hoses for high-pressure gas filling devices such as hydrogen filling devices often have higher rigidity and poorer operability compared to hoses used for supplying liquid fuel such as oil. When a high-rigidity filling hose is bent to connect a filling nozzle to a FCV's receptacle, an elastic rebound force of the filling hose acts on the filling nozzle, making it difficult to remove the nozzle from the receptacle after hydrogen filling. In other words, in high-pressure gas filling devices, the high rigidity of the filling hose causes problems with operability and difficulty in removing the filling nozzle from the receptacle after filling. No effective solution for these problems has been proposed yet.

The applicant has previously proposed technology that involves a swivel joint at the connection between a gun-type fueling nozzle and a fueling hose at gas stations (refer to Patent Document 1, for example). While such technology is useful, rigidity of the fueling hoses in fuel dispensers and that of hydrogen dispensers are entirely different, resulting in significant differences in temperature and pressure ranges of operating fluids. Thus, simply equipping the connection between the hydrogen dispenser's nozzle and hose with a similar swivel joint as in Patent Document 1 does not solve issues of the operational difficulty due to the rigidity of the hydrogen dispenser's filling hose and the difficulty in removing the nozzle from the receptacle after hydrogen filling.

The content of JP-A-2003-128199 gazette is incorporated herein by reference in its entirety.

BRIEF SUMMARY

The present invention has been proposed in view of the above-mentioned problems of the prior art, and the object thereof is to provide a support structure that can eliminate the difficulty of operation due to the rigidity of the filling hose and prevent difficulty in removing the filling nozzle from the receptacle after filling.

A support structure (100) of the present invention includes a swivel joint (3: the first swivel joint) in a filling hose (2) that connects a filling nozzle (1) and a gas supply pipe of the dispenser (10) (for example, a hydrogen supply pipe), and the swivel joint (3) comprises a nozzle side member (3B in FIG. 1) communicating with the filling nozzle (1) side, and a dispenser side member (3A in FIG. 1) communicating with the dispenser (10) side. The nozzle side member and the dispenser side member are relatively rotatable, and a high-pressure gas flow path (3AR) formed in the nozzle side member and a high-pressure gas flow path (3BR) formed in the dispenser side member are characterized by being orthogonal to each other. It should be noted that the term "filling hose" in this specification may also include a filling pipe.

In a support structure (100-1) of the present invention, an end of the filling hose (2) connected to the swivel joint (3) is connected to a safety coupling (4), and the safety coupling (4) has a nozzle side member (4A) and a dispenser side member (4B), with their flow paths being orthogonal to each other. It is preferable that the dispenser side member (4B) of the safety coupling (4) is coupled with a bearing (4C: a pillow block having a function of a bearing).

Preferably, the dispenser side member (4B) of the safety coupling (4) is connected (either via a pipe (6) or directly without a pipe) to a second swivel joint (3-1) (support structures 100-2, 100-3). Alternatively, it is preferable to connect the second swivel joint (3-1) to the swivel joint (3: the first swivel joint) interposed in the filling nozzle (1) (support structure 100-4).

Here, the dispenser (10) according to the present invention includes the aforementioned support structures (100 to 100-4: any of the support structures of claims 1 to 4) and features swivel joints (3, 3-1) located at bent parts (elbow parts) of pipes, each having two members with internal flow paths, where the central axes of the flow paths of these two members intersect each other.

According to the support structure for filling nozzle of the present invention with the above construction, the swivel joint (3: first swivel joint) is equipped in the filling hose (2) that connects the filling nozzle (1) and the gas supply pipe (for example, hydrogen supply pipe) of the dispenser (10), and the swivel joint (3) has the nozzle-side member communicating with the filling nozzle (1) side and a dispenser-side member communicating with the dispenser (10) side. The nozzle-side and dispenser-side members are capable of relative rotation, and the high-pressure gas flow path (3AR) formed in the nozzle-side member and the high-pressure gas flow path (3BR) formed in the dispenser-side member intersect each other. Thus, placing the swivel joint (3) near the filling nozzle (1) enables, for instance, when the filling nozzle (1) is connected to the FCV receptacle, the filling hose (2) not to bent sharply. Therefore, it prevents the situation where the clastic rebound force of the filling hose (2) near the filling nozzle (1) acts on the connection part between the receptacle and the filling nozzle (1), preventing the filling nozzle (1) from detaching from the receptacle. Here, the swivel joint, where the flow paths formed in the nozzle-side member and dispenser-side member intersect, is used in gasoline refueling devices but not in hydrogen dispensers. In hydrogen dispensers, which have a higher rigidity filling hose compared to gasoline refueling devices, the above-mentioned function is useful.

Furthermore, in the present invention, an end of the filling hose (2) connected to the swivel joint (3) is connected to the safety coupling (4), and the safety coupling (4) has the nozzle-side member (4A) and the dispenser-side member (4B), with flow paths inside both members intersecting. If the dispenser-side member (4B) of the safety coupling (4) is coupled with a bearing (4C: a pillow block functioning as a bearing), even if the filling hose (2) flexes and generates an elastic rebound force (FC), rotation of the bearing (4C) allows the filling hose (2) to rotate and release the elastic rebound force (FC). Therefore, it prevents the elastic rebound force (FC) generated by the flexing of the filling hose (2) from acting on the connection part between the receptacle and the filling nozzle (1), preventing the filling nozzle (1) from detaching from the receptacle.

Moreover, in the present invention, if the dispenser-side member (4B) of the safety coupling (4) is connected to the second swivel joint (3-1), either through the pipe (6) or directly, or if the second swivel joint (3-1) is connected to the swivel joint (3: first swivel joint) interposed in the filling nozzle (1), the filling hose (2) will be able to rotate in three directions. Thus, any elastic rebound force or tension in any direction of the filling hose (2) will be absorbed by rotation in one of these three directions. Therefore, when operating the filling hose (2), its elastic rebound force is absorbed, making handling easier and improving operability.

According to the present invention, in the support structure (100-100-4: any of the structures of claims 1 to 4) described above, if the connection point between the equipment and the pipe loosens, rotating the pipe with respect to, for example, a heat exchanger (5) and tightening it, rotational torque caused by the rotation is absorbed by the swivel joint. Thus, it is possible to resolve the looseness at the connection point between the pipe and the heat exchanger (5) or the like, and no damage due to the rotational torque occurs. Also, pipe stress can be alleviated.

BRIEF DESCRIPTION OF THE DRAWINGS

FIG. 1 is a perspective view showing a filling nozzle support structure according to the first embodiment of the present invention.

FIG. 2 is a sectional view of a swivel joint used in embodiments of the present invention.

FIG. 3 is an explanatory view showing merits of using a swivel joint where center axes of flow paths intersect.

FIG. 4 is an explanatory view showing demerits of a joint where center axes of flow paths extend in the same direction.

FIG. 5 is an explanatory view showing a filling nozzle support structure according to the second embodiment of the present invention.

FIG. 6 is an explanatory view showing a filling nozzle support structure according to the third embodiment of the present invention.

FIG. 7 is an explanatory view showing the first variation of the third embodiment.

FIG. 8 is an explanatory view showing the second variation of the third embodiment.

FIG. 9 is an explanatory view showing piping inside a dispenser.

FIG. 10 is an explanatory view showing an outline of a filling nozzle support structure according to the fourth embodiment of the present invention.

FIG. 11 is a perspective view showing a variation of the first embodiment shown in FIGS. 1 to 4.

DETAILED DESCRIPTION

Hereinafter, embodiments of the present invention will be described with reference to the accompanying drawings. The illustrated embodiments mainly describe examples involving supply of hydrogen. First, the first embodiment of the present invention is described with reference to FIGS. 1 to 4. In FIG. 1, a support structure according to the first embodiment of the present invention is indicated by reference numeral 100. The support structure 100 includes a filling nozzle 1, a filling hose 2 which is a pipe supplying hydrogen from a dispenser 10 side, and a swivel joint 3 interposed between them. One end of the swivel joint 3 is connected to the filling nozzle 1 and rotatably supports the filling nozzle 1 as shown by the arrow R1 in FIG. 1. The other end of the swivel joint 3 is connected to the filling hose 2, which is connected to a member on the dispenser 10 side. The swivel joint 3 has a nozzle-side member (indicated by 3B in FIG. 1) and a dispenser-side member (indicated by 3A in FIG. 1). Although details will be described later with reference to FIG. 2, in the swivel joint 3, a rotatable member is indicated by reference numeral 3A, and a non-rotating member is indicated by reference numeral 3B. In FIG. 1, reference numeral 2A indicates a connection member on the filling hose 2 side.

With the support structure 100 according to the first embodiment, when filling a high-pressure gas (e.g., hydrogen gas), the direction of flow of the high-pressure hydrogen gas changes at a right angle at the location where it passes through the swivel joint 3. Therefore, even when the filling nozzle 1 is coupled and fixed to an FCV receptacle, the filling hose 2 in the vicinity of the filling nozzle 1 will not bend at a sharp angle, and the elastic rebound force is reduced. Thus, the situation where the elastic rebound force of the filling hose 2 in the vicinity of the filling nozzle 1 acts on the connection part between the receptacle and the filling nozzle 1, preventing the filling nozzle 1 from detaching from the receptacle, can be prevented. In FIG. 1, the swivel joint 3 allows the filling hose 2 to rotate in the direction, shown by the arrow B1, perpendicular to the plane of the paper.

In FIG. 2 showing a cross-section of the swivel joint 3 used in FIG. 1, the rotatable member 3A includes a pin-like part 3A1 and a nozzle connection part 3A2, while the non-rotating member 3B includes a main body 3B1 and a hose connection part 3B2. In FIG. 2, the pin-like part 3A1 of the rotatable member 3A is inserted into a hollow part 3BRC of the main body 3B1 of the non-rotating member 3B and is supported so as to be rotatable. Thus, the rotatable member 3A is rotatably supported by the non-rotating member 3B and is relatively rotatable as indicated by arrows R2 in FIG. 2 and R1 in FIG. 1. Here, a high-pressure gas flow path 3AR of the rotatable member 3A and a high-pressure gas flow path 3BR of the non-rotating member 3B orthogonal each other. The high-pressure gas flow path 3AR is formed in the pin-like part 3A1 of the rotatable member 3A and communicates with the hollow part 3BRC through a through-hole 3ARI extending radially outward. On the other hand, the high-pressure gas flow path 3BR is formed in the main body 3B1 of the non-rotating member 3B and communicates with the hollow part 3BRC. The pin-like part 3A1 is fixed in a manner to be described later so as not to move in the axial direction. Therefore, even if the rotatable member 3A and the non-rotating member 3B rotate mutual to each other, the high-pressure gas flow path 3AR of the rotatable member 3A and the high-pressure gas flow path 3BR of the non-rotating member 3B are always in communication through the hollow part 3BRC.

In FIG. 2, the pin-like part 3A1 of the rotatable member 3A is configured so as not to come off or fall out of the main body 3B1 of the non-rotating member 3B. Retainers 30 and 31 are inserted into the hollow parts 3B3 and the hollow part 3B4 of the main body 3B1, respectively. The retainers 30 and 31, with male threads formed on their outer peripheries, are threaded into screw fitting parts 32 and 33, respectively, and fixed to the main body 3B1. The pin-like part 3A1 is rotatably supported by the retainers 30 and 31 on bearings 34 and 35. Snap rings 36 and 37 are placed at one end of the bearings 34 and 35 to prevent the pin-like part 3A1 from coming off the main body 3B1 or the retainers 30 and 31. In order to prevent the pin-like part 3A1 from coming off, besides the snap rings 36 and 37, other members can be used. A thrust bearing 38 is arranged at the end of the pin-like part 3A1 on the nozzle connection part 3A2 side. In FIGS. 1 to 4, the member 3A is joined to the filling hose 2 and becomes the "dispenser-side member", while the member 3B is joined to the filling nozzle 1 and becomes the "nozzle-side member". However, it is also possible to connect the member 3A to the filling nozzle 1 to make it the "nozzle-side member" and to connect the member 3B to the filling hose 2 to make it the "dispenser-side member".

Next, referring to FIGS. 3 and 4, advantages of the swivel joint 3 (refer to FIGS. 1 and 2) of the type where the high-pressure gas flow path 3AR of the member 3A and the high-pressure gas flow path 3BR of the member 3B intersect are explained. In FIG. 3, the filling nozzle 1 connected to one end (3B side) of the swivel joint 3 is coupled with an FCV side receptacle 101. The other end (3A side) of the swivel joint 3 is connected to one end of the filling hose 2, and the other end of the filling hose 2 is connected to a dispenser side member 10G. Here, since the swivel joint 3 is of the type where the high-pressure gas flow path 3AR of the member 3A and the high-pressure gas flow path 3BR of the member 3B is orthogonal, when the filling nozzle 1 is coupled to the FCV's receptacle 101, the filling hose 2 in the vicinity of the filling nozzle 1 will not bend at a sharp angle, and no strong elastic rebound force is generated in the filling hose 2 near the filling nozzle 1. Therefore, a situation is prevented where a strong elastic rebound force develops in the filling hose 2 near the filling nozzle 1, acting on the connection part between the receptacle 101 and the filling nozzle 1 and preventing the filling nozzle 1 from not detaching from the receptacle 101. Moreover, in FIG. 3, when the filling hose 2 flexes, an elastic rebound force FC is generated, potentially pushing the filling nozzle 1 towards the receptacle 101, but providing a mechanism to rotate the filling hose 2 in the direction of the arrow D on the dispenser side member 10G makes it possible to rotate the filling hose 2 in the direction of arrow DI and release the clastic rebound force FC. As a result, no strong elastic rebound force from the filling hose 2 acts on the vicinity of the swivel joint 3, the filling nozzle 1, or the receptacle 101. The mechanism for rotating the filling hose 2 in the direction of the arrow D, as mentioned above, can be composed of the safety coupling 4, which will be described later with reference to FIG. 5, for example.

In FIG. 4, the filling hose 2 and the filling nozzle 1 are connected using a joint 103 of the type in which the high-pressure gas flow paths of the mutually rotating members (nozzle side member, dispenser side member) extend in the same direction. In the case of FIG. 4, when the filling nozzle 1 is coupled to the FCV receptacle 101, the filling hose 2 must be bent with a small radius of curvature in the vicinity of the filling nozzle 1, an area AD. Due to such bending, an elastic rebound force indicated by the arrow FD acts on the filling hose 2 and the filling nozzle 1. Therefore, when using the joint 103 shown in FIG. 4, the elastic rebound force FD generated by the filling hose 2 being bent with a small radius of curvature in the vicinity of the filling nozzle 1 acts on the coupling part between the receptacle 101 and the filling nozzle 1, which may lead to a situation where the filling nozzle 1 does not come off the receptacle 101.

In FIG. 1, the swivel joint 3 is arranged at an end of the filling nozzle 1 in the longitudinal direction (central axis direction). In contrast, as shown in a modified example shown in FIG. 11, the swivel joint 3 can also be connected to a side of the filling nozzle 1. The other configurations and effects of the modified example in FIG. 11 are the same as those in the first embodiment shown in FIGS. 1 to 4.

Next, referring to FIG. 5, a filling nozzle support structure according to the second embodiment of the present invention will be described. In the second embodiment shown in FIG. 5, a mechanism is provided for rotating the filling hose 2 in the direction of the arrow D in FIGS. 3 and 4. In FIG. 5, the support structure of the second embodiment is indicated by reference numeral 100-1. The support structure 100-1, like the support structure 100 according to the first embodiment, has the filling nozzle 1, the filling hose 2, and the swivel joint 3 arranged between the filling nozzle 1 and the filling hose 2. In addition, the support structure 100-1 of the second embodiment has a safety coupling 4 provided at the end of the filling hose 2 opposite the swivel joint 3. The safety coupling 4 has a nozzle side member 4A and a dispenser side member 4B, and a high-pressure gas flow path (not shown) inside the nozzle side member 4A and a high-pressure gas flow path (not shown) inside the dispenser side member 4B are orthogonal to each other. The dispenser side member 4B of the safety coupling 4 is connected to a second swivel joint 3-1 via a connecting member 6A.

In FIG. 5, the dispenser side member 4B of the safety coupling 4 is coupled with a pillow block 4C. The pillow block 4C functions as a bearing, allowing the dispenser side member 4B to rotate as indicated by the arrow R5 in FIG. 5. Besides a pillow block, other elements can be used as the bearing. Although not clearly shown, the pillow block 4C is fixed to a member at a predetermined position of the dispenser. The member for fixing the pillow block 4C and the position where the pillow block 4C is fixed can be appropriately selected. The rotation of the safety coupling 4 in the direction of arrow R5 by the pillow block 4C corresponds to the rotation of the filling hose 2 in the direction of arrow D in FIG. 3. In other words, as shown in FIG. 5, combining the pillow block 4C with the safety coupling 4 enables to rotate the filling hose 2 in the direction of arrow D in FIG. 3. Furthermore, the filling hose 2 can follow in the direction of detachment when pulled. According to the support structure 100-1 shown in FIG. 5, even if the filling hose 2 flexes and the elastic rebound force FC (see FIG. 3) is generated, the rotation of the pillow block 4C (bearing) allows the filling hose 2 to rotate, thereby releasing the elastic rebound force FC. As a result, it is possible to prevent the elastic rebound force FC from acting on the coupling part between the receptacle and the filling nozzle 1, thereby preventing the situation where the filling nozzle 1 does not come off the receptacle.

Referring to FIG. 6, a filling nozzle support structure according to the third embodiment of the present invention will be explained. The support structure related to the third embodiment in FIG. 6 is indicated by the reference numeral 100-2. Structure (not shown) on the side of the filling nozzle 1 is the same as those (filling nozzle 1, filling hose 2, swivel joint 3) in FIG. 5. A safety coupling 4, similar to that in FIG. 5, is provided at the end opposite to the swivel joint 3 (not shown) of the filling hose 2, and the dispenser side member 4B of the safety coupling 4 is coupled with a pillow block 4C, which functions as a bearing. In the support structure 100-2, the dispenser side member 4B of the safety coupling 4 is connected to a second swivel joint 3-1 via a pipe 6, and the second swivel joint 3-1 is connected to the dispenser 10 side via a pipe 7.

The second swivel joint 3-1, like the swivel joint 3 (first swivel joint) coupled to the filling nozzle 1, has a rotatable member 3A-1 (nozzle side member in FIG. 6) connected to the pipe 6 side and a non-rotatable member 3B-1 (dispenser side member in FIG. 6) connected to the pipe 7 side. A high-pressure gas flow path formed in the nozzle side member 3A-1 and a high-pressure gas flow path formed in the dispenser side member 3B-1 are orthogonal to each other. The dispenser side member 3B-1 of the second swivel joint 3-1 rotatably (in the direction of the arrow R6 in FIG. 6) supports the pipe 7.

If handling the filling hose 2 is to be made easier, it is preferable for it to rotate in three directions. If there are three rotational axes, elastic rebound force or tension in any direction of the filling hose 2 can be absorbed by the rotation of any of the three axes. In the support structure 100-2, the filling hose 2 rotates by the first swivel joint 3 (see FIG. 5, not shown in FIG. 6) provided on the side of the filling nozzle 1. Bearing function of the pillow block 4C combined with the safety coupling 4 allows the filling hose 2 to rotate in the direction of the arrow R5 (FIGS. 5 and 6). Furthermore, because the pipe 7 rotates in the direction of the arrow R6 (FIG. 6) by the second swivel joint 3-1, the elastic rebound force or tension in any direction of the filling hose 2 can be absorbed by the rotation of any of the three directions of the first and second swivel joints 3, 3-1, and the pillow block 4C. Therefore, when operating the rigid filling hose 2 used for hydrogen filling, the handling of the filling hose 2 becomes easier, and operability improves because the elastic rebound force is absorbed by either the first and second swivel joints 3, 3-1, or the pillow block 4C.

Referring to FIG. 7, the first modified example of the third embodiment shown in FIG. 6 will be explained. In the support structure 100-2 shown in FIG. 6, the pipe 6 is omitted in the support structure 100-3 according to the first modified example of FIG. 7, and the dispenser side member 4B of the safety coupling 4 is directly connected to the second swivel joint 3-1. In FIG. 7 also, as in FIG. 6, structure near the filling nozzle 1 is omitted. The support structure 100-3 is effective in cases where layout space for the support structure is limited due to layout constraints or similar factors in the dispenser.

Referring to FIG. 8, the second modified example of the third embodiment will be explained. In the third embodiment of FIG. 6 and the first modified example of FIG. 7, the second swivel joint 3-1 is provided in the area on the dispenser side of the pillow block 4C and is arranged separated from the first swivel joint 3. In contrast, in the second modified example's support structure 100-4 in FIG. 8, the filling nozzle 1 is connected to the filling hose 2 via the first swivel joint 3 and the second swivel joint 3-1, and the first swivel joint 3 is directly coupled to the second swivel joint 3-1. The rotatable member 3A of the first swivel joint 3 supports the filling nozzle 1 to be rotatable in the direction of the arrow RIA in FIG. 8. The non-rotating member 3B of the first swivel joint 3 is connected to the rotatable member 3A-1 of the second swivel joint 3-1. The nozzle side member 3A-1 of the second swivel joint 3-1 is rotatable in the direction of the arrow R2A in FIG. 8 relative to the first swivel joint 3. The member 3B-1 is connected to the filling hose 2. The second swivel joint 3-1 in the second modified example of FIG. 8 has the same configuration and function as the first swivel joint 3 and is similar in configuration and function to the second swivel joint 3-1 in FIGS. 6 and 7.

Although not clearly shown in FIG. 8, the dispenser side of the filling hose 2 is connected to the safety coupling 4, similar to FIGS. 5 to 7, and the safety coupling 4 is of the type where high-pressure gas flow paths inside the nozzle side member 4A and the dispenser side member 4B are orthogonal to each other (refer to FIGS. 5 to 7). The dispenser side member 4B of the safety coupling 4 is coupled with the pillow block 4C (refer to FIGS. 5 to 7), which has a bearing function. Therefore, in the second modified example of FIG. 8 also, the first and second swivel joints 3, 3-1, and the bearing function of the pillow block 4C (not shown in FIG. 8) allow for rotation in three directions, so that the elastic rebound force and tension acting in any direction on the filling hose 2 can be absorbed or released. Therefore, handling of the filling hose 2 becomes easier, and operability is improved. This is also applicable in situations where layout constraints in the dispenser are severe.

The embodiments shown are applicable not only to the support structure of the filling nozzle or the filling hose but also to other applications. Referring to FIGS. 9 and 10, the fourth embodiment, where the present invention is applied to other than the support structure of the filling nozzle or the filling hose, will be explained. First, referring to FIG. 9, an example of piping of a hydrogen dispenser 10 to which the present invention is applied will be explained. In FIG. 9, the hydrogen dispenser indicated by the reference numeral 10 includes a hydrogen supply pipe 11, a flow meter 12, a flow control valve (pressure regulating valve) 13, a gas pipeline cooling section 14, a shut-off valve 15, and a control device 20. The flow meter 12, the flow control valve 13, the gas pipeline cooling section 14, and the shut-off valve 15 are interposed in the hydrogen supply pipe 11. The gas pipeline cooling section 14 includes a heat exchanger 5, which will be described later with reference to FIG. 10. The hydrogen supply pipe 11 has an inlet side pressure gauge 16, an outlet side pressure gauge 17, and a thermometer 18 interposed. A pipe 11-1 connecting a branch point 11E of the hydrogen supply pipe 11 and a dispersion pipe 19 has a pressure reducing valve 21 interposed. The upstream side of the hydrogen supply pipe 11 is connected to a hydrogen gas supply source (for example, a hydrogen cylinder or a hydrogen storage tank) not shown. The downstream side of the hydrogen supply pipe 11 communicates with a filling hose and a filling nozzle not shown and is connected to a tank of an FCV during hydrogen filling. In FIG. 9, the supply pipe communicating with the filling hose and the filling nozzle is indicated by the reference numeral 7. The reference numeral 22 indicates a switch box housing a start switch, a stop switch, and an emergency stop switch, and 23 indicates a gas detector. Input signals from the control panel 24 are input to the control device 20, output results of the control device 20 are displayed on a display 25, and if necessary, output to an alarm device 26.

Although not clearly shown in FIG. 9, in piping inside the hydrogen dispenser, a pipe may be connected by screwing it into equipment. For example, the connection point with the heat exchanger 5 repeatedly expands and recovers the material of the pipe, etc., due to rapid cooling by hydrogen supply and thermal cycling at normal temperature, as well as pressure cycling during and not during the supply of high-pressure hydrogen. Therefore, the connection point between the heat exchanger and the pipe is more likely to loosen compared to other parts of the piping. If the connection point becomes loose, and it is possible to screw the pipe by rotating it, the work can be done easily. However, if the pipe is screwed into the heat exchanger by rotation, torque is applied to the pipe, and there is a risk of damaging the connection point of the pipe or the heat exchanger.

In FIG. 10, the heat exchanger 5 is connected to the hydrogen supply pipe 11 (11A, 11B) via the swivel joint 3 shown in the embodiments of FIGS. 1 to 8. As explained in FIGS. 1 to 4, the swivel joint 3 is a type with two members with flow paths formed inside, and the flow paths of the two members are orthogonal to each other. In FIG. 10, it constitutes a bending part in the hydrogen supply pipe 11. If the swivel joint 3 is used as a bending part in the hydrogen supply pipe 11, even if the connection part that has become loose is screwed in, rotation or rotational torque caused by it is absorbed by the swivel joint 3. Therefore, loosening at the connection points between the hydrogen supply pipe 11 and the heat exchanger 5, etc., can be resolved with simple work, and damage to the pipe and the connection points of the heat exchanger due to rotational torque can be prevented.

It should be noted that the illustrated embodiments are merely examples and are not intended to limit technical scope of the present invention.

DESCRIPTION OF THE REFERENCE NUMERALS

1 filling nozzle
2 filling hose
3 swivel joint (first swivel joint)
3-1 second swivel joint
3A, 3A-1 rotatable members
3B, 3B-1 non-rotatable members
3AR, 3BR high-pressure gas flow paths
4 safety coupling
4A nozzle side member
4B dispenser side member
4C pillow block
5 heat exchanger
10 dispenser
100 (100-1 to 100-4) support structure

The invention claimed is:

1. A filling nozzle support structure including a swivel joint interposed between a filling nozzle and a filling hose that connects the filling nozzle and a gas supply pipe of a dispenser, said swivel joint comprising:

- a nozzle side member communicating with the filling nozzle side; and
- a dispenser side member communicating with the dispenser side;
- wherein said nozzle side member and said dispenser side member are relatively rotatable with each other, and a high-pressure gas flow path formed in the nozzle side member and a high-pressure gas flow path formed in the dispenser side member are orthogonal to each other; and
- wherein one end of said swivel joint is connected to said filling nozzle and rotatably supports said filling nozzle, and the other end of said swivel joint is connected to said filling hose, and when said filling nozzle is coupled and fixed to a receptacle, said filling hose in the vicinity of said filling nozzle does not bend at a sharp angle, and an elastic rebound force is reduced, thereby preventing a situation where the elastic rebound force of said filling hose in the vicinity of said filling nozzle acts on a connection part between said receptacle and said filling nozzle to impede detachment of said filling nozzle from said receptacle.

2. The filling nozzle support structure as claimed in claim 1, wherein an end of the filling hose connected to the swivel joint is connected to a safety coupling, the safety coupling has a nozzle side member and a dispenser side member, a flow path in the nozzle side member and a flow path in the dispenser side member are orthogonal to each other, and the dispenser side member of the safety coupling is coupled with a bearing.

3. The filling nozzle support structure as claimed in claim 2, wherein said dispenser side member of the safety coupling is connected to a second swivel joint.

4. The filling nozzle support structure as claimed in claim 3, wherein said swivel joint interposed in the filling nozzle is connected to the second swivel joint.

5. A dispenser comprising one of the support structure claimed in claim 4, wherein at a bent part of piping is located a swivel joint having two members with internal flow paths, and central axes of the flow paths of these two members intersect each other.

6. A dispenser comprising one of the support structure claimed in claim 3, wherein at a bent part of piping is located a swivel joint having two members with internal flow paths, and central axes of the flow paths of these two members intersect each other.

7. A dispenser comprising one of the support structure claimed in claim 2, wherein at a bent part of piping is located a swivel joint having two members with internal flow paths, and central axes of the flow paths of these two members intersect each other.

8. The filling nozzle support structure as claimed in claim 2, wherein the bearing is configured to allow the dispenser side member of the safety coupling to rotate such that the filling hose rotates to release an elastic rebound force of the filling hose.

9. The filling nozzle support structure as claimed in claim 8, wherein the bearing comprises a pillow block.

10. A dispenser comprising one of the support structure claimed in claim 1 wherein at a bent part of piping is located a swivel joint having two members with internal flow paths, and central axes of the flow paths of these two members intersect each other.

11. The filling nozzle support structure as claimed in claim 1, wherein, when high-pressure gas is filled through the filling nozzle, a direction of flow of the high-pressure gas changes at a right angle at the swivel joint such that the filling hose in the vicinity of the filling nozzle does not bend at the sharp angle.

12. The filling nozzle support structure as claimed in claim 11, wherein the swivel joint is configured to allow the filling hose to rotate relative to the filling nozzle when the filling nozzle is coupled and fixed to the receptacle.

13. The filling nozzle support structure as claimed in claim 12, wherein, when the filling hose flexes and the elastic rebound force is generated, rotation of the filling hose releases the elastic rebound force such that the elastic rebound force is prevented from acting on a connection part between the receptacle and the filling nozzle.

* * * * *